(12) United States Patent
Koren

(10) Patent No.: US 6,207,968 B1
(45) Date of Patent: Mar. 27, 2001

(54) READING HEAD FOR AN OPTICAL SCANNING DEVICE

(75) Inventor: Jacob Koren, Haifa (IL)

(73) Assignee: Orex Computed Radiography Ltd., Nesher (IL)

( * ) Notice: Subject to any disclaimer, the term of this patent is extended or adjusted under 35 U.S.C. 154(b) by 0 days.

(21) Appl. No.: 09/105,085

(22) Filed: Jun. 26, 1998

(30) Foreign Application Priority Data

Jun. 30, 1997 (IL) .......................................... 121194

(51) Int. Cl.$^7$ ................................................. G03B 42/02
(52) U.S. Cl. .......................... 250/585; 250/581; 250/584; 250/586; 250/228
(58) Field of Search ..................................... 250/585, 581, 250/584, 586, 228

(56) References Cited

U.S. PATENT DOCUMENTS

| 4,302,671 | 11/1981 | Kato et al. . | |
|---|---|---|---|
| 4,547,670 | 10/1985 | Sugimoto et al. . | |
| 5,229,608 | * 7/1993 | Lange et al. | 250/585 |
| 5,399,877 | 3/1995 | Carter et al. | 250/581 |

FOREIGN PATENT DOCUMENTS

| 0 142 839 | 5/1985 | (EP) . |
| 0 423 891 A1 | 4/1991 | (EP) . |
| 0 667 540 A1 | 8/1995 | (EP) . |
| 6713349 | 8/1969 | (NL) . |

OTHER PUBLICATIONS

Kinebuchi Takao, Latent Image Reader, Jan. 28, 1994, Pub. No. 06–019014, Filed Jul. 03, 1992, Journal: Section: P, Section No. 1729, vol. 18, No. 223, p. 167, Apr. 21, 1994 (19940421).

* cited by examiner

Primary Examiner—Constantine Hannaher
Assistant Examiner—Andrew Israel
(74) Attorney, Agent, or Firm—Nath & Associates PLLC; Gary M. Nath; Harold L. Novick

(57) ABSTRACT

For use with an optical scanning device, a reading head comprising a housing having at least one bore for accommodating therein a respective photo-multiplier tube and a non-intersecting lateral bore for accommodating therein a stimulating light source for producing a stimulating beam having a first wavelength. A focusing lens is mounted in association with the stimulating light source for focusing the stimulating beam on a film of the scanning device so as to produce stimulated fluorescent light having a second wavelength in the film at a point of contact by the stimulating beam. A window is provided within the housing for mounting therein a filter for transmitting therethrough the stimulated fluorescent light whilst substantially blocking reflections of the stimulating beam. The housing is mounted in spaced relationship with the film so as to direct the stimulating light beam perpendicular to the film such that a distance from the film to an internal periphery of the lateral bore within the housing is equal to a focal length of the focusing lens, and the stimulating light source is fixed within the lateral bore so that the focusing lens is in precise registration with the internal periphery.

16 Claims, 6 Drawing Sheets

READING HEAD FOR AN OPTICAL SCANNING DEVICE

FIELD OF THE INVENTION

This invention relates to diagnostic imaging using photostimulatable X-rays.

BACKGROUND OF THE INVENTION

It is known to use low dosage X-rays so as to provide latent images which may be stimulated off-line so as to expose the hidden images. Such a technique is disclosed, for example in U.S. Pat. No. 4,547,670. As disclosed in EP 423 891 the latent images are produced by X-rays which impinge on a specially coated film containing a suitably reactive material. The latent image is stored in the coating as a spatially distributed pattern of excited electrons which are trapped in a manner quantitatively indicative of an amount of electromagnetic energy spatially distributed on the film. A visible image can be derived from the resultant latent image by inducing the trapped electrons to fluoresce such that the intensity of the fluorescence is quantitatively indicative of the intensity of the spatially distributed X-ray radiation which was originally absorbed by the film. After the information has been extracted, the entire film is exposed to light, thereby leveling off all of the X-ray excitable electrons to a non-energized state, thus conditioning the film for re-use.

Image scanners have become very common for converting many types of analog input data into computer compatible information. Such scanners have a laser light source for directing on to a film which is generally disposed on a surface of a drum, and are further equipped with means for reading the light reflected by the film.

FIG. 1 shows such a radiographic latent image reader for exposing a phosphor storage sheet to an excitation laser beam as described in JP 6019014. A laser beam 30 from a laser light source 16 is reflected by mirrors 22 and 24, passes through a selecting mirror 26 and a condensing lens 28, and irradiates the recording surface 12 of a stimulatable phosphor 10. The fluorescence generating by the phosphor 10 is condensed by the lens 28, reflected by the mirror 26 and detected by a fluorescence detecting device 20 after its red light reflections are cut by a filter 34. By subjecting the reader to transverse motion in the direction shown by the arrow 15 so as completely traverse the width of the recording surface 12, the entire surface of the phosphor 10 may be read.

It is apparent, therefore, that in the system described in JP 6019014, complex imaging and scanning optics are required which are cumbersome and space-consuming. This, in turn, militates against the provision of more than one scanning optics per drum so as to scan along only a fraction of thereof, thereby allowing different sections of the film to be scanned by more than one scanning optics simultaneously. As a result, such prior art systems are relatively slow.

It would obviously be desirable to replace the complex imaging and scanning optics of JP 6019014 with a compact unit allowing several such units to be provided along the width of the film, so as to allow parallel processing thereof. The prior art makes no attempt to address this requirement.

U.S. Pat. No. 4,302,671 (Kato et al.) discloses a radiation image readout device for reading a stimulatable phosphor. The radiation image readout device includes a photosensor for detecting light produced by the phosphor upon its being stimulated, and a reflecting optical element like a mirror located between the phosphor and the photosensor for reflecting stimulating rays advancing between the phosphor and the photosensor towards the phosphor. The reflecting optical element has a very small size not to intercept the light emitted by the phosphor and detected by the photosensor as much as possible.

The stimulatable phosphor is mounted on a rotary drum and the photosensor is secured to a readout head which is movable in the direction of the axis of the drum. Stimulation of the phosphor is achieved by means of a laser mounted parallel to the drum's axis so as to direct a beam of laser light between the photosensor and the drum so as to be reflected by the mirror toward the stimulatable phosphor plate.

Such an arrangement is also not adapted for multiple reading heads since the stimulating laser beam is directed towards the photosensor along the axis of the drum. Consequently, at most two reading heads might possibly be employed in back-to-back arrangement with respective laser beams directed in opposite directions towards each other. There is no obvious way to employ such an arrangement for the simultaneous stimulation and reading of more than two points on the phosphor. Furthermore the arrangement lacks compactness, is relatively slow and expensive.

SUMMARY OF THE INVENTION

It is therefore an object of the invention to provide a reading head for a laser scanner in which the above-mentioned drawbacks are overcome so as to allow several compact reading heads to be provided each for reading a respective section of a film.

According to the invention there is provided a reading head for a optical scanning device, said reading head comprising:

a housing having at least one bore for accommodating therein a respective photo-multiplier tube and a non-intersecting lateral bore for accommodating therein a stimulating light source for producing a stimulating beam having a first wavelength, a focusing lens mounted in association with the stimulating light source for focusing the stimulating beam on a film of the scanning device so as to produce stimulated fluorescent light having a second wavelength in said film at a point of contact by said stimulating beam, a window within the housing for mounting therein a filter for transmitting therethrough the stimulated fluorescent light whilst substantially blocking reflections of the stimulating beam, mounting means associated with said housing for mounting the housing in spaced relationship with said film so as to direct the stimulating light beam perpendicular to the film such that a distance from the film to an internal periphery of the lateral bore within the housing is equal to a focal length of the focusing lens, and registration means within the housing for registering the stimulating light source within the lateral bore so that the focusing lens is in precise registration with said internal periphery.

The reading head according to the invention is compact such that the path of the stimulating beam lies very close to the photo-multiplier tube. Preferably the reading head is adapted to accommodate within the central bore thereof a side-entry photo-multiplier tube, allowing an end the photo-multiplier tube to be brought into close proximity with the film thus reducing still further the size of the reading head. Such a construction allows for a plurality of reading heads to be mounted in tandem, thus allowing respective sections of a film to be read in parallel and reducing the cycle time for reading the complete film. Furthermore, side-entry photo-multiplier tubes are less expensive than front-entry photo-multiplier tubes and thus the reading head according to the invention is not only more compact and simpler than hitherto proposed scan systems but is also less costly. The reduction in cost is, of course, particularly significant when multiple reading heads are provided.

BRIEF DESCRIPTION OF THE DRAWINGS

In order to understand the invention and see how the same may be carried out in practice, some preferred embodiments will now be described, by way of non-limiting example only, with reference to the accompanying drawings, in which:

FIG. 2c is a perspective view showing a hood assembly for attaching to the reading head shown in FIG. 2a;

DETAILED DESCRIPTION OF PREFERRED EMBODIMENTS

Figure 1:
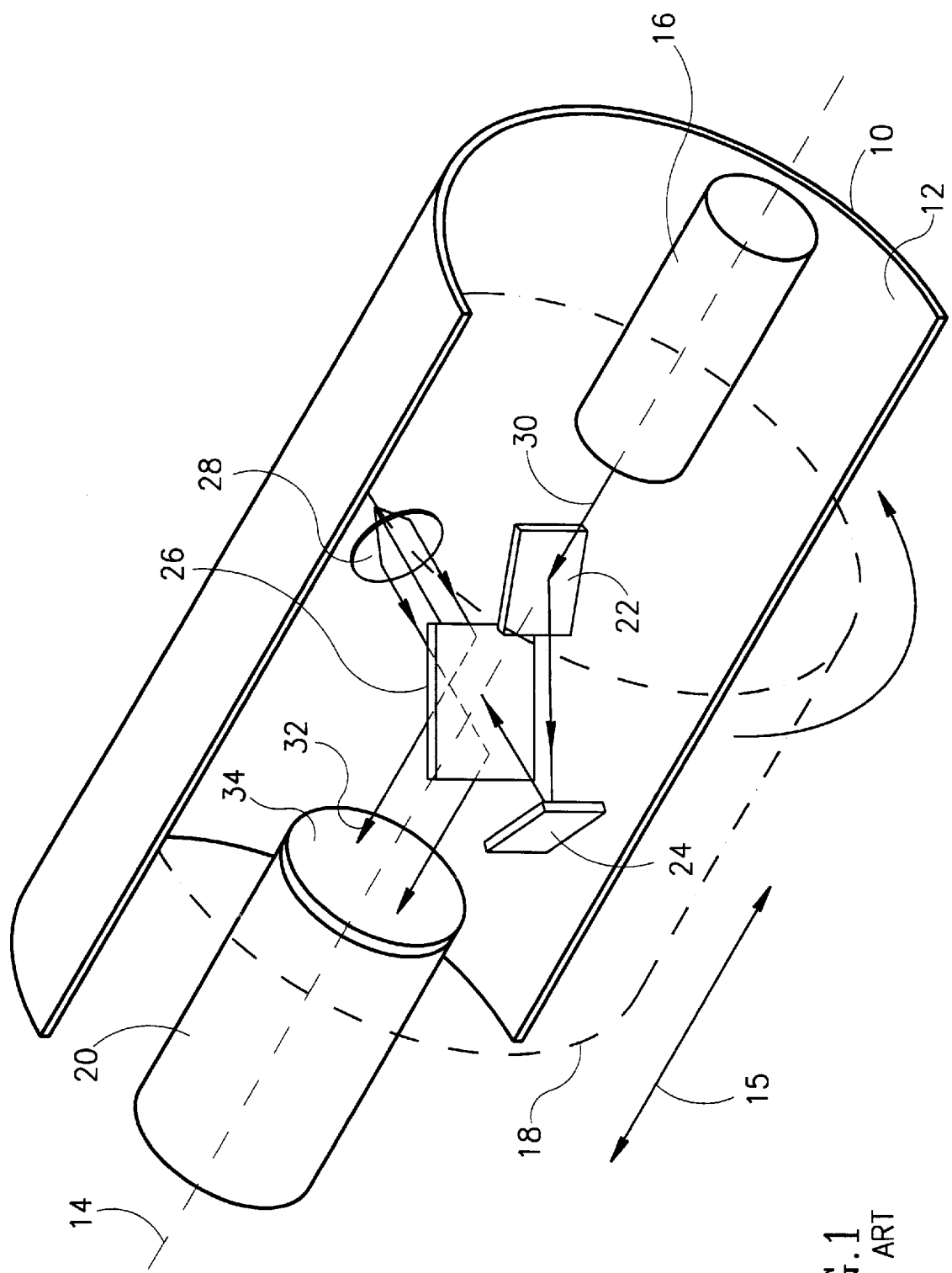
FIG. 1 shows schematically a typical prior art scanning system.
Figure 2A:
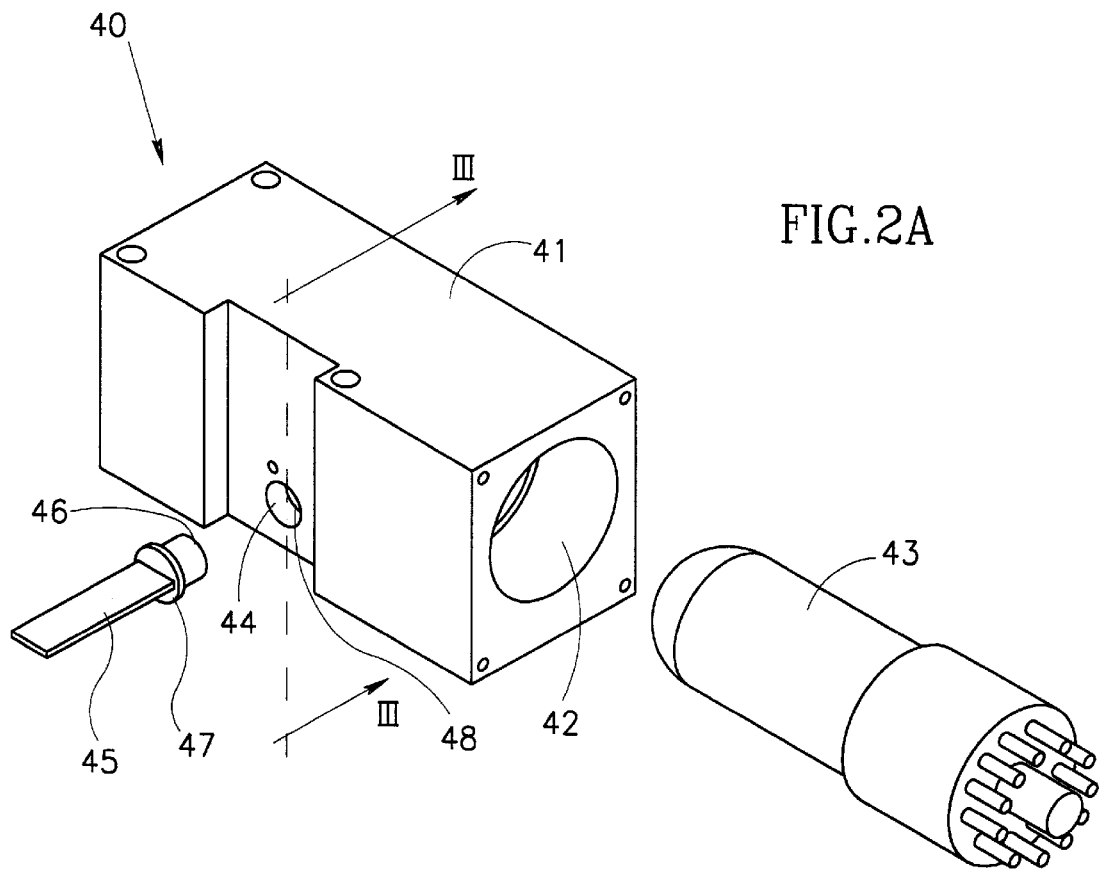
FIG. 2a is an exploded view showing in perspective a reading head according to the invention.
Figure 2B:
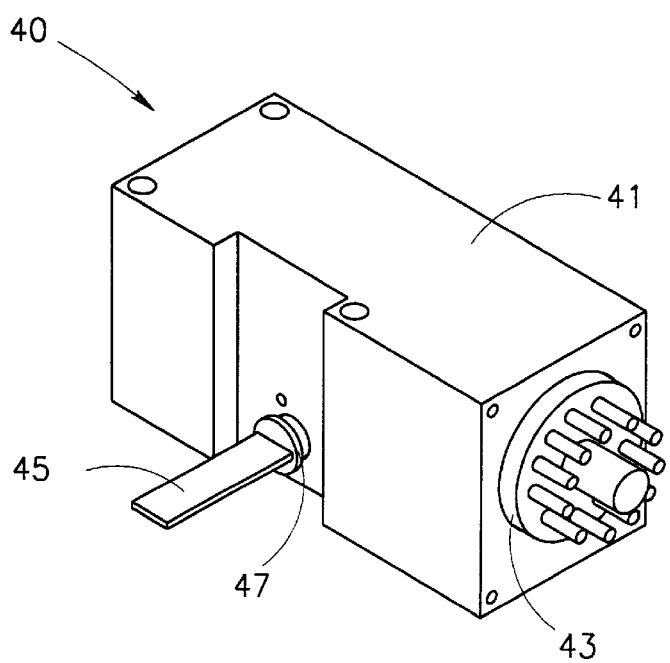
FIG. 2b is a perspective view showing the reading head when fully assembled.
Figure 2C:
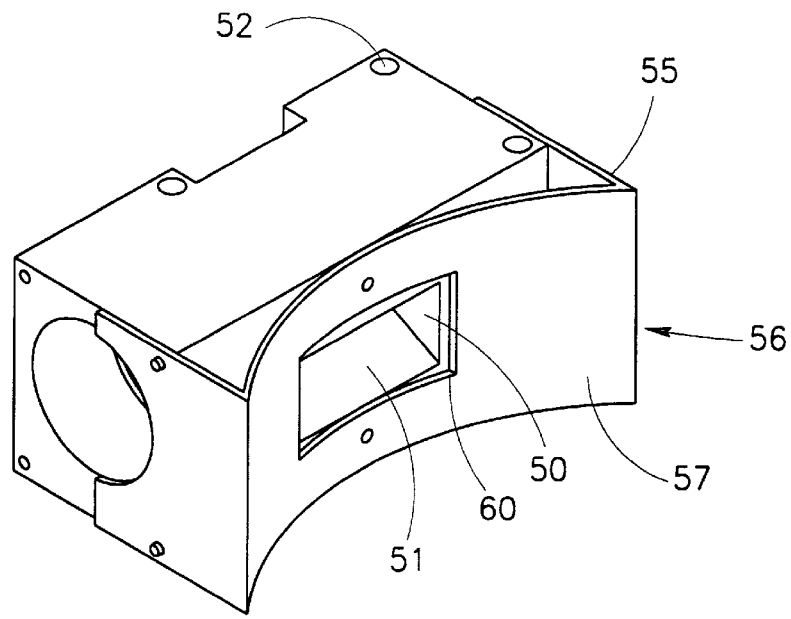

FIGS. 2a to 2c show a reading head 40 according to the invention for an optical scanning device (not shown). The reading head 40 comprises a housing 41 having a central bore 42 for accommodating therein a photo-multiplier tube 43 and a lateral bore 44 for accommodating therein a laser diode 45 (constituting a stimulating light source) for producing a stimulating beam having a wavelength of 635 nm (constituting a first wavelength). The lateral bore 44 is located within the housing 41 relative to the central bore 42 so that the two bores do not intersect, thereby allowing the stimulating beam unimpeded passage through the reading head 40 without striking the photo-multiplier tube 43. This requirement is met in practice by positioning the lateral bore 44 tangential to the central bore 42, thereby reducing as much as possible the size of the reading head 40.

A focusing lens 46 is mounted in association with the laser diode 45 for focusing the stimulating beam on a film of the scanning device so as to produce stimulated fluorescent light having a wavelength of 390 nm (constituting a second wavelength) at a point of contact with the film by the stimulating beam. The lateral bore 44 functions as a recess for accommodating the laser diode 45 which has a peripheral flange 47 on an exterior thereof, so that when the laser diode 45 is fully inserted into the lateral bore 44, the peripheral flange 47 engages an outer surface of the housing 41, thereby arresting further movement of the laser diode 44. The housing 41 and the distance of the peripheral flange 47 from the focusing lens 46 thus cooperate as a registration means for registering the laser diode 45 within the lateral bore 44 so that the focusing lens 46 is in precise registration with an internal periphery 48 of the lateral bore 44.

A window 50 is provided within the housing 41 opposite the lateral bore 44 and accommodates therein a filter 51 for transmitting therethrough the stimulating beam whilst substantially blocking reflections thereof within an interior of the housing. Around an exterior of the housing 41 are a plurality of threaded bores 52 (constituting mounting means) for mounting the housing 41 in spaced relationship with the film so as to direct the laser beam perpendicular to the film. The housing 41 is dimensioned such that the distance from the film to the internal periphery 48 of the lateral bore 44 is precisely equal to the focal length of the focusing lens 46. By such means, the peripheral flange 47 ensures that the laser diode 45 is properly focused without requiring special calibration.

FIG. 2c shows a hood assembly 55 for mounting on the housing 41 so as to prevent passage of stray light from the reading head 40. The hood assembly 55 comprises a shield 56 having a concave external surface 57 being of a complementary shape to that of a support surface 58 of a scanning device drum 59 (see FIG. 3) for supporting the film thereon. The shield 56 being provided with an aperture 60 aligned with the window 50 of the reading head 40 and dimensioned substantially to prevent light leakage between the window 50 and an outer perimeter of the aperture 60. Thus, in use, the reading 40 in conjunction with the hood assembly 55 are mounted in a scanning device with the shield 56 proximate a film supported on a drum of the scanning device as shown in FIGS. 5 and 6.

Figure 3:
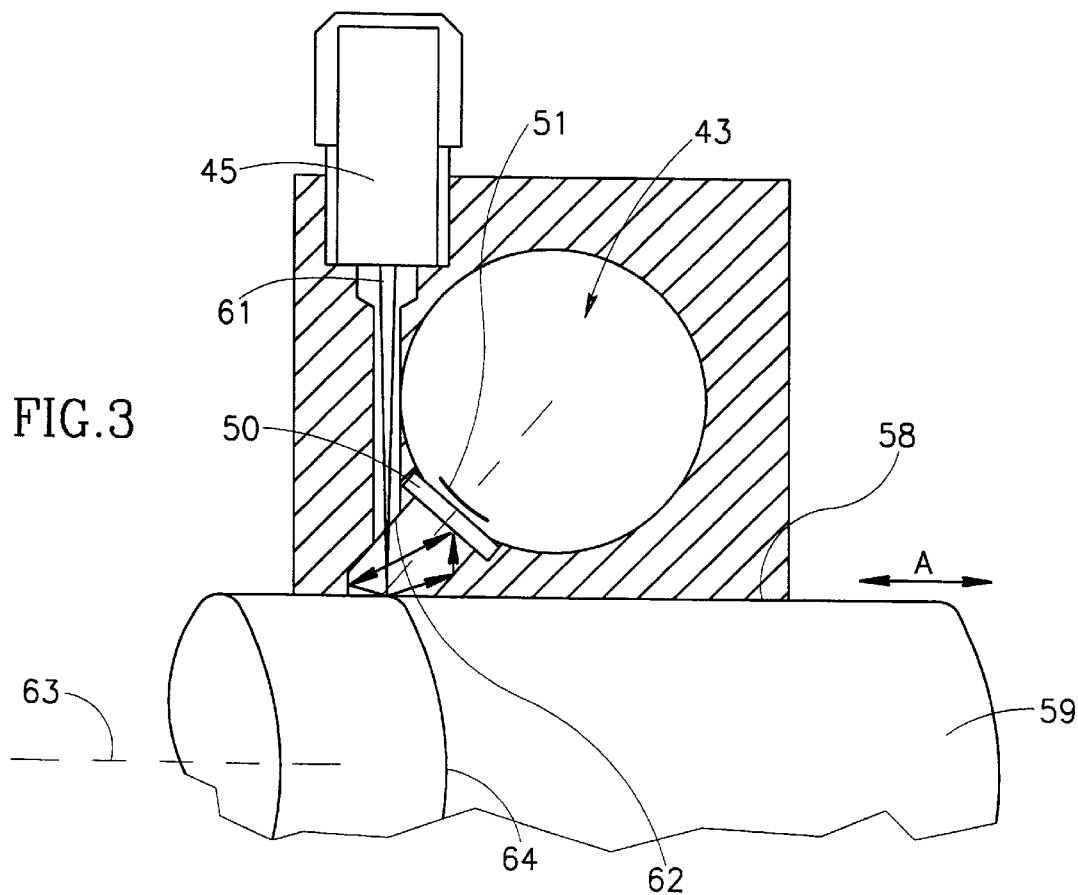
FIG. 3 is a partial sectional elevation through the line III—III in FIG. 2a showing a detail of the reading head aligned with an external surface of a scanning device drum.

FIG. 3 is a partial sectional elevation through the line III—III in FIG. 2a showing a detail of the reading head 40 aligned with the external support surface 58 of the scanning device drum 59. The laser diode 45 directs a stimulating beam 61 in a direction normal to the drum 59 on which is mounted a film having thereon a latent image formed by X-ray stimulation. As seen in the figure, the laser diode 45 is located tangential to the central aperture 42 so as to allow the stimulating laser beam 61 to pass through the housing 41 without being obstructed by the photo-multiplier tube 43. The stimulating laser beam 61 is focused by the lens 46 so as to strike the film on the drum 59 thereby inducing stimulated fluorescent light having a wavelength equal to 390 nm at a point of contact with the film by the stimulating beam 61. In order to maximize the quantity of fluorescent light reaching the photo-multiplier tube, an internal wall 62 of the housing 41 has a mirrored surface which reflects the stimulated fluorescent light as well reflections of the stimulating beam 61. As a result, part of the stimulated fluorescent light reaches the filter 51 in the window 50 directly, whilst part re-enters the housing 41 together with reflections of the stimulating beam 61, both striking the filter 51. Both the direct and indirect components of the fluorescent light pass through the filter 51, whilst the reflections of the stimulating beam are substantially blocked by the filter 51. Consequently, only the stimulated fluorescent light, indicative of the latent image on the film, passes through to the photo-multiplier tube 43 where it is amplified and processed in known manner.

In use, the drum 59 is rotated about an axis 63 thereof by a motor (not shown) so as to allow a circumferential line 64 aligned with the point of contact of the stimulating beam 61 to be read. At the end of each circumferential scan, the reading head 40 is moved by a carriage (constituting a conveying means not shown in the figure) in a direction shown by arrow A along the axis to the drum 59 whereby successive circumferential scans permit the whole of the film to be read.

Figure 4:
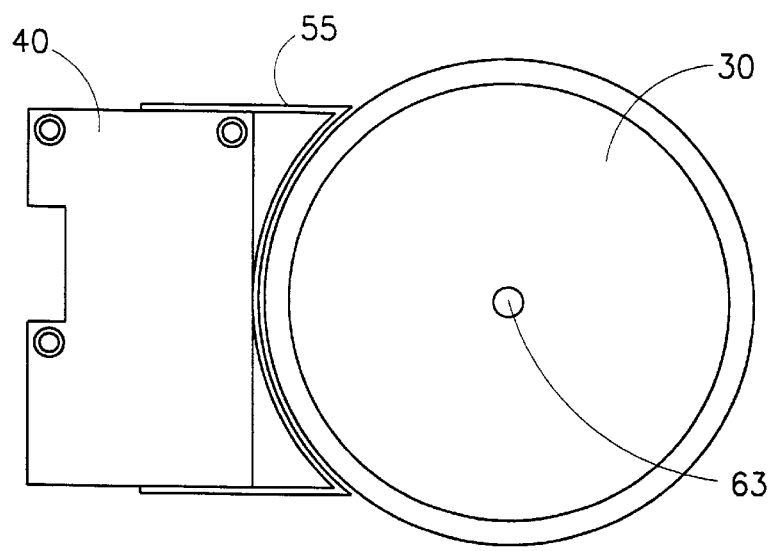
FIG. 4 is an end elevation of the reading head shown in FIGS. 2a to 2c proximate a drum scanner for reading a film mounted on an external surface thereof.
Figure 5:
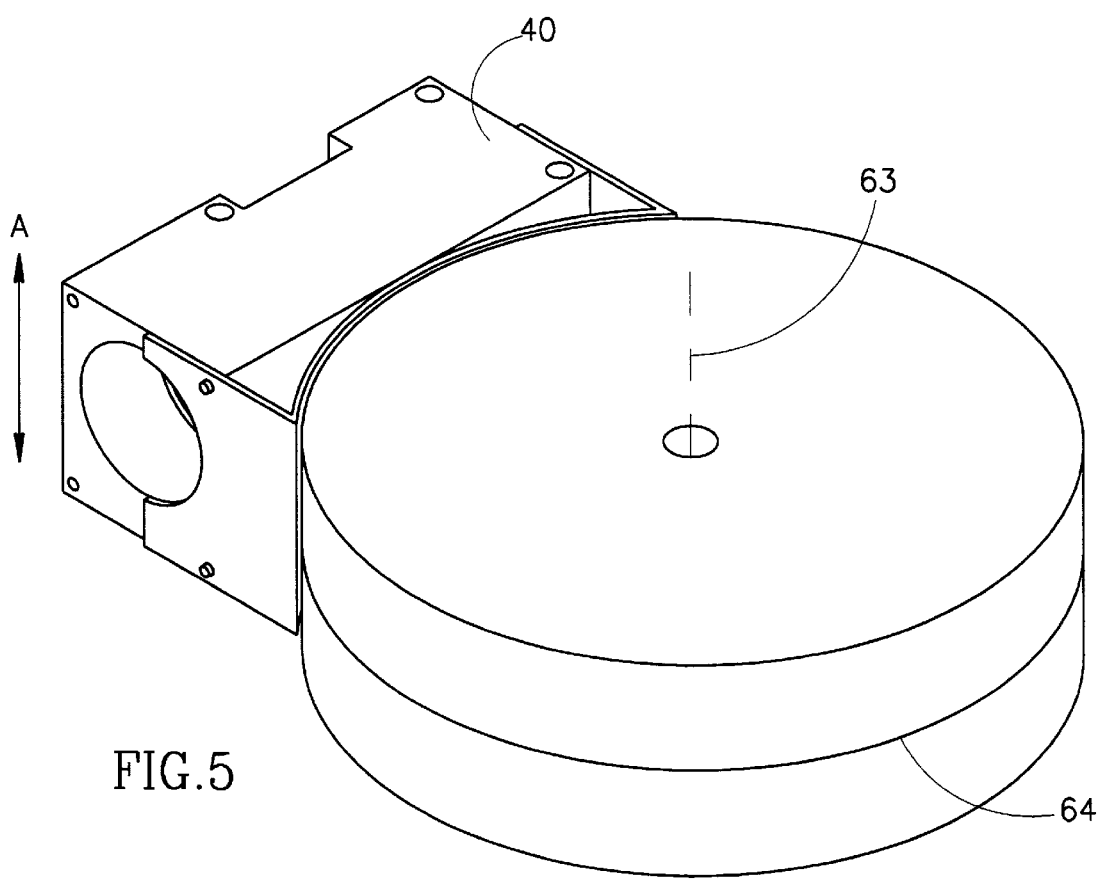
FIG. 5 is a perspective view of the arrangement shown in FIG. 4 illustrating the alignment of the reading head with the drum.
Figure 6:
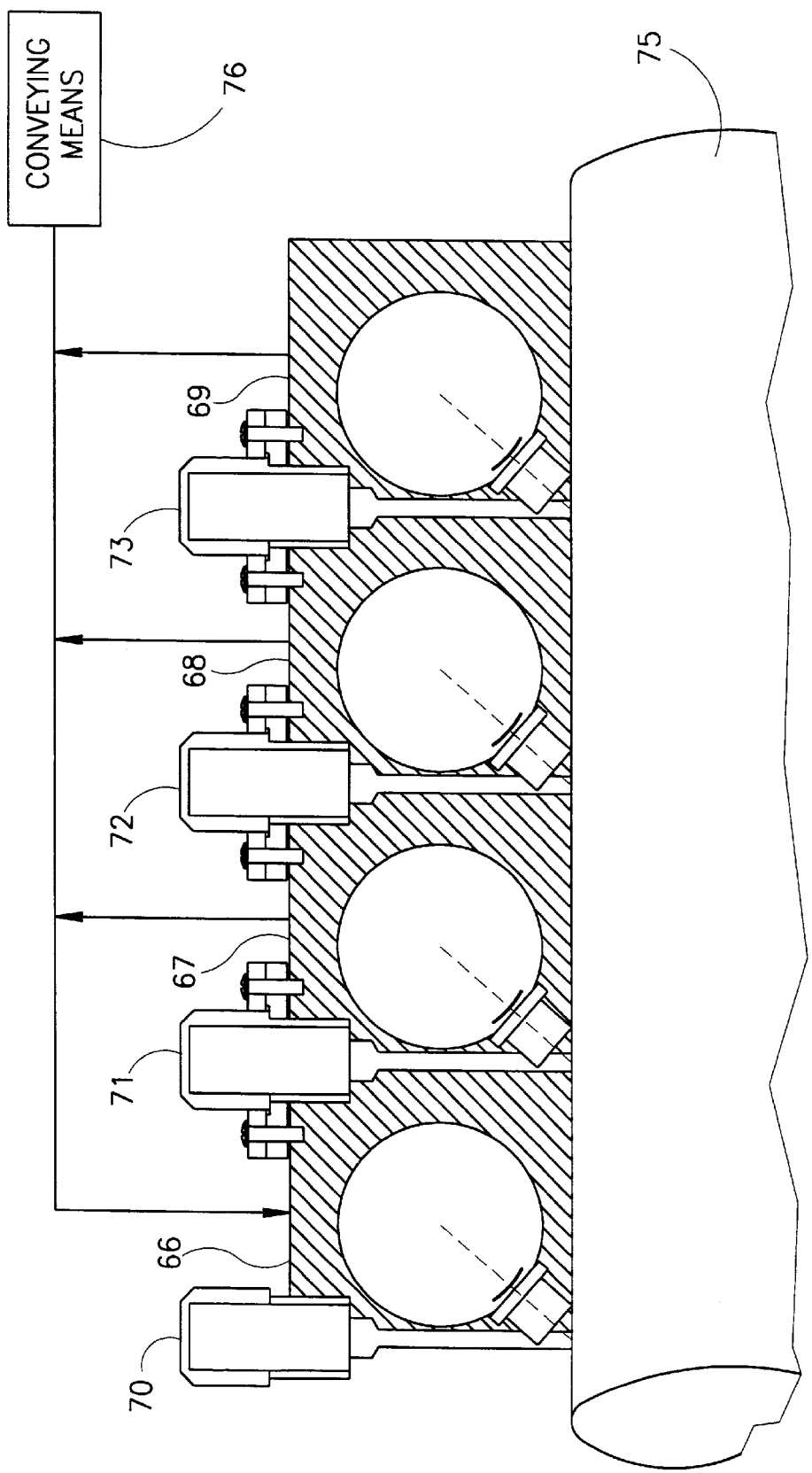
FIG. 6 is a partial sectional view showing schematically a detail of a scanner having multiple reading heads.

FIGS. 4 and 5 show respectively an end elevation and a perspective view of the reading head 40 proximate the drum 59 showing the hood assembly 55 which reduces stray leakage of the light reflected by the film thus ensuring that as much as possible of the reflected beam passes through to the photo-multiplier tube 43.

FIG. 6 is a partial sectional view showing schematically a detail of a scanner 65 having multiple reading heads. Thus, as shown by way of example only, there are provided four reading heads 66, 67, 68 and 69 each having corresponding laser diodes 70, 71, 72 and 73 for directing respective beams on to an external support surface 74 of a drum 75. The four reading heads 66, 67, 68 and 69 are commonly coupled to a conveying means, depicted functionally as 76 allowing the four reading heads to be moved in a direction along the axis of the drum 75. Thus, each of the four reading heads 66, 67, 68 and 69 is adapted to read a respective section along the axis of the drum 75, each reading head 66, 67, 68 and 69 reading a complete circumferential scan as the drum 75 is rotated about its axis.

It will be appreciated that whilst the four reading heads 66, 67, 68 and 69 are shown in mutually contiguous relationship, they may in fact be spaced apart providing, of course, that the maximum displacement of the conveying means 76 allows for each reading head to read sufficient data so that the whole film can be read. In practice, the axial images of two adjacent reading heads are arranged to overlap slightly thus ensuring that no data is lost, whilst allowing overlapping data to be correctly interpreted under software control as is well known in the art.

Figure 7:
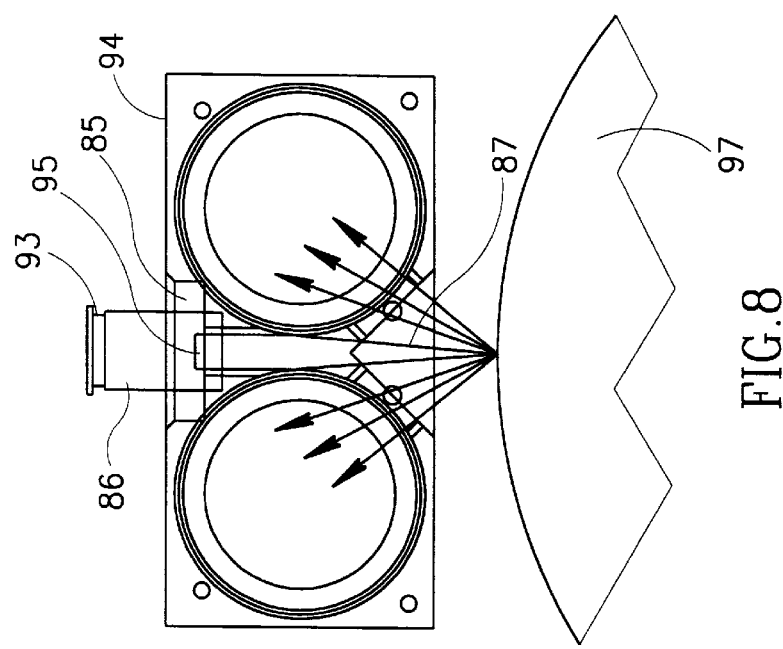
FIG. 7 is an exploded view of a reading head in accordance with a second embodiment of the invention employing two photo-multiplier tubes.
Figure 8:
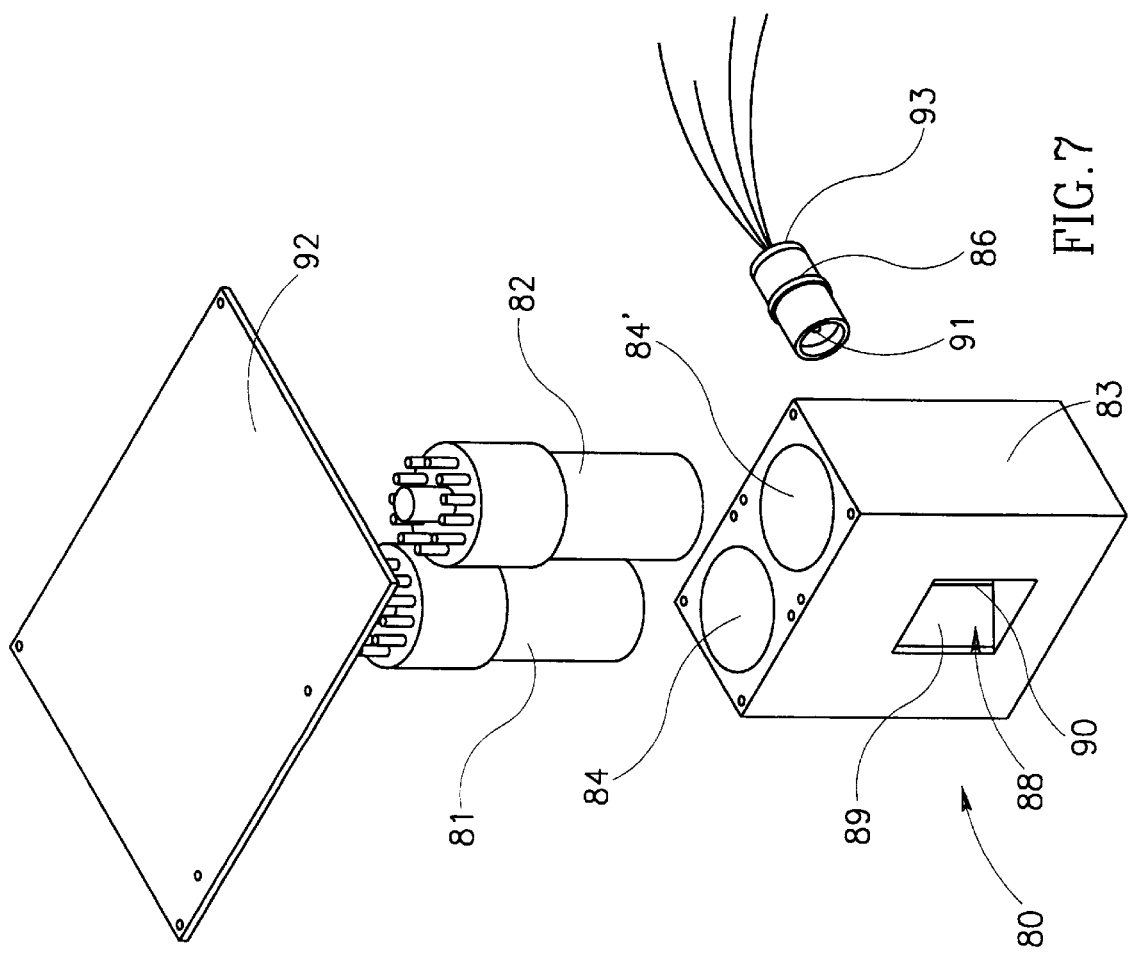
FIG. 8 is partial sectional view of the reading head shown in FIG. 7 through line VII—VII showing the optics associated therewith.

Reference is now made to FIGS. 7 and 8 showing respectively an exploded view and a partial plan view of a reading head 80 in accordance with a second embodiment of the invention employing two photo-multiplier tubes 81 and 82. The reading head 80 comprises a housing 83 having two parallel bores 84 and 84' each for accommodating a respective one of the photo-multiplier tubes 81 and 82. A lateral bore 85 disposed in the housing 83 mid-way between the photo-multiplier tubes 81 and 82 accommodates a laser diode 86 for producing a stimulating beam of light 87. A window 88 is provided within the housing 83 opposite the lateral bore 85 and accommodates therein a pair of filters 89 and 90 each directed to the point of contact with the film by the stimulating beam. The filters 89 and 90 allow transmission therethrough of the stimulating beam whilst substantially blocking reflections thereof within an interior of the housing 83. A focusing lens 91 is mounted in association with the laser diode 86 for focusing the stimulating beam on a film 92 of the scanning device so as to produce stimulated fluorescent light having a wavelength of 390 nm at the point of contact with the film by the stimulating beam.

The lateral bore 85 functions as a recess for accommodating the laser diode 86 which has a peripheral flange 93 on an exterior thereof, so that when the laser diode 86 is fully inserted into the lateral bore 85, the peripheral flange 93 engages an outer surface 94 of the housing 83, thereby arresting further movement of the laser diode 86. The housing 83 and the distance of the peripheral flange 93 from the focusing lens 91 thus cooperate as a registration means for registering the laser diode 86 within the lateral bore 85 so that the focusing lens 91 is in precise registration with an internal periphery 95 of the lateral bore 85.

Around an exterior of the housing 83 are a plurality of threaded bores (not shown) for mounting the housing 83 in spaced relationship with the film 92 so as to direct the laser beam perpendicular to the film. The housing 83 is dimensioned such that the distance from the film to the internal periphery 95 of the lateral bore 85 is precisely equal to the focal length of the focusing lens 91. By such means, the peripheral flange 93 ensures that the laser diode 87 is properly focused without requiring special calibration.

As further seen in FIG. 8, the reading head 80 is aligned with an external support surface 96 of a scanning device drum 97. The laser diode 86 directs the stimulating beam 87 in a direction normal to the drum 97 on which is mounted the film 92 having thereon a latent image formed by X-ray stimulation. As seen in the figure, the laser diode 87 is located substantially tangential to the apertures 84 and 84' so as to allow the stimulating laser beam 87 to pass through the housing 83 without being obstructed by the photo-multiplier tubes 81 and 82. The stimulating laser beam 87 is focused by the lens 91 so as to strike the film 92 on the drum 97 thereby inducing stimulated fluorescent light having a wavelength equal to 390 nm at a point of contact with the film by the stimulating beam 87. Only the fluorescent light passes through the filters 89 and 90, whilst the reflections of the stimulating beam 87 are substantially blocked by the filters 89 and 90. Consequently, only the stimulated fluorescent light, indicative of the latent image on the film, passes through to the photo-multiplier tubes 84 and 84' where it is doubly amplified and processed in known manner.

It will be appreciated that whilst in the preferred embodiments the reading head is shown mounted exterior to the scanning drum it may equally well be mounted inside the drum. In this case, the hood assembly is provided with a convex shield which again is of complementary shape to the internal support surface of a scanning device drum.

In the preferred embodiments, mention has been made of the reflecting internal surface of the housing for maximizing the quantity of light collected by a single photo-multiplier. In effect, the reflecting internal surface collects stray fluorescent light for redirecting, via the filter, into the photo-multiplier tube so as thereby to increase its output. It will be appreciated that there may be applications where there is sufficient light to render this feature unnecessary. Likewise, as described, stray fluorescent light may be directed into a second photo-multiplier mounted side-by-side with the first photo-multiplier so as to collect the stray stimulated fluorescent light. .

It should also be understood that, whilst the invention has been described with particular reference to a laser light source for producing the stimulating beam, it has been found in practice that a light emitting diode (LED) is also effective for achieving the desired stimulation.

What is claimed is:

1. A reading head for an optical scanning device, said reading head comprising:

a housing having at least one bore for accommodating therein a respective photo-multiplier tube and a non-intersecting lateral bore for accommodating therein a stimulating light source for producing a stimulating beam having a first wavelength, a focusing lens mounted in association with the stimulating light source for focusing the stimulating beam on a film of the scanning device so as to produce stimulated fluorescent light having a second wavelength in said film at a point of contact by said stimulating beam, a window within the housing for mounting therein a filter for transmitting therethrough the stimulated fluorescent light whilst substantially blocking reflections of the stimulating beam, mounting means associated with said housing for mounting the housing in spaced relationship with said film so as to direct the stimulating light beam perpendicular to the film such that a distance from the film to an internal periphery of the lateral bore within the housing is equal to a focal length of the focusing lens, and registration means within the housing for registering the stimulating light source within the lateral bore so that the focusing lens is in precise registration with said internal periphery.

2. The reading head according to claim 1, wherein the at least one photo-multiplier tube is a side entry photo-multiplier tube.

3. The reading head according to claim 1, wherein the stimulating light source is a solid state device.

4. The reading head according to claim 3, wherein the solid state device comprises a solid state laser.

5. The reading head according to claim 4, wherein the solid state laser comprises a laser diode in association with said focusing lens.

6. The reading head according to claim 3, wherein the solid state device comprises a light emitting diode.

7. The reading head according to any claim 3, wherein the first wavelength is substantially equal to 635 nm and the second wavelength is substantially equal to 390 nm.

8. The reading head according to any claim 3, wherein the registration means comprises a recess within the housing for engaging a peripheral flange on an exterior of the solid state laser.

9. The reading head according to claim 8, wherein the solid state device is fixed within the lateral bore of the housing after registration therein.

10. The reading head according to claim 9, wherein the solid state device is glued within the lateral bore of the housing.

11. The reading head according to claim 1, wherein the filter is fixedly mounted with the window.

12. The reading head according to claim 1, further including a hood assembly for preventing passage of stray light from the reading head, said hood assembly comprising a shield having an external surface of a shape which is complementary to that of a support surface of the scanning device for supporting the film thereon and being provided with an aperture aligned with the window of the reading head and dimensioned substantially to prevent light leakage between said window and an outer perimeter of the aperture.

13. The reading head according to claim 1, wherein two side-by-side photo-multiplier tubes are mounted within the housing and the stimulating light source is disposed laterally symmetrically with respect to said two photo-multiplier tubes.

14. The reading head according to claim 1, wherein:
the at least one photo-multiplier tube is a single photo-multiplier tube, and an internal wall of the housing is provided with a reflecting surface for reflecting the stimulated fluorescent light as well as reflections of the stimulating beam so as to redirect the reflected stimulated fluorescent light via the filter into said photo-multiplier tube, thereby increasing an output thereof.

15. A system for reading a digital image from a photo-stimulatable film pre-exposed to high energy radiation so as to produce a latent image on the film, said system comprising:

a cylindrical drum for mounting the exposed film on a surface of the drum, at least one reading head comprising:
a housing having at least one bore for accommodating therein a respective photo-multiplier tube and a non-intersecting lateral bore for accommodating therein a stimulating light source for producing a stimulating beam having a first wavelength, a focusing lens mounted in association with the stimulating light source for focusing the stimulating beam on a film of the scanning device so as to produce stimulated fluorescent light having a second wavelength in said film at a point of contact by said stimulating beam, a window within the housing for mounting therein a filter for transmitting therethrough the stimulated fluorescent light whilst substantially blocking reflections of the stimulating beam, mounting means associated with said housing for mounting the housing in spaced relationship with said film so as to direct the stimulating light beam perpendicular to the film such that a distance from the film to an internal periphery of the lateral bore within the housing is equal to a focal length of the focusing lens, and registration means within the housing for registering the stimulating light source within the lateral bore so that the focusing lens is in precise registration with said internal periphery;

said at least one reading head being mounted proximate to said surface of the drum so as to direct the stimulating beam perpendicular to the film, said stimulated fluorescent beam passing through the respective filter in said at least one reading head on to the at least one photo-multiplier tube in the respective photo-multiplier tube thereby generating an amplified output signal, conveying means coupled to said reading head for axially conveying the at least one reading head relative to the drum, drive means coupled to the drum for rotating the drum about an axis thereof, and processing means coupled to the respective at least one photo-multiplier tube in said at least one reading head for receiving the output signal therefrom and generating an image therefrom.

16. The system according to claim 15, including at least two reading heads commonly coupled to said conveying means for scanning respective portions of the film along the axis of the drum.

* * * * *